No. 704,194. Patented July 8, 1902.
A. L. JAYNES.
WORKMAN'S TIME RECORDER.
(Application filed Sept. 26, 1900.)

(No Model.) 4 Sheets—Sheet 1.

No. 704,194. Patented July 8, 1902.
A. L. JAYNES.
WORKMAN'S TIME RECORDER.
(Application filed Sept. 26, 1900.)
(No Model.) 4 Sheets—Sheet 2.

No. 704,194. Patented July 8, 1902.
A. L. JAYNES.
WORKMAN'S TIME RECORDER.
(Application filed Sept. 26, 1900.)

(No Model.) 4 Sheets—Sheet 3.

Witnesses
Arthur L Bryant
C. W. Clement

Inventor
A. L. Jaynes
By Watson & Watson
Attorneys

THE NORRIS PETERS CO., PHOTO-LITHO., WASHINGTON, D. C.

No. 704,194. Patented July 8, 1902.
A. L. JAYNES.
WORKMAN'S TIME RECORDER.
(Application filed Sept. 26, 1900.)
(No Model.) 4 Sheets—Sheet 4.

UNITED STATES PATENT OFFICE.

ALFONSO L. JAYNES, OF BUFFALO, NEW YORK, ASSIGNOR, BY MESNE ASSIGNMENTS, TO INTERNATIONAL TIME RECORDING COMPANY.

WORKMAN'S TIME-RECORDER.

SPECIFICATION forming part of Letters Patent No. 704,194, dated July 8, 1902.

Application filed September 26, 1900. Serial No. 31,145. (No model.)

*To all whom it may concern:*

Be it known that I, ALFONSO L. JAYNES, a citizen of the United States, residing at Buffalo, in the county of Erie and State of New York, have invented certain new and useful Improvements in Workmen's Time-Recorders, of which the following is a specification.

This invention consists in a machine for recording the time of arrival and departure at factories, stores, offices, and other places of workmen or other employees. The machine is ordinarily styled a "workman's time-recorder;" but it will be evident that it is adapted to record time upon one or more detached cards for any purpose.

The principal object of the invention is to produce a time-recorder of this class in which the printing of the time upon a card is caused to take place by the simple insertion of the card into the machine, automatic printing mechanism being provided in the machine which is brought into action by the card.

Another object of the invention is to provide a machine into which the cards are always thrust to the same extent.

These objects having been accomplished, the workman is only required to push his card into the machine and withdraw it again in order to have printed thereon the time of his arrival or departure. A great saving of time is thereby effected as compared with the use of old devices in which the workman was required to place his card in a machine distances which varied from day to day and over machines in which the workman was required to insert his card and then operate a handle or lever to actuate the printing mechanism. In this improved machine it is impossible to mark a card in the wrong place when the machine is properly adjusted, and a common defect of machines of this class heretofore in use is thus avoided.

The invention will now be described with reference to the accompanying drawings, in which—

Fig. 14 is an edge view of a card adapted for use without a sheath.

Referring to the drawings, in which like reference-signs indicate the same parts throughout the several views, a indicates a casing, which may be of any form suitable to inclose and support the mechanism. The mechanism comprises three principal parts—the time-stamp s, the time mechanism t, and the stamp-actuating mechanism u.

Figure 5:
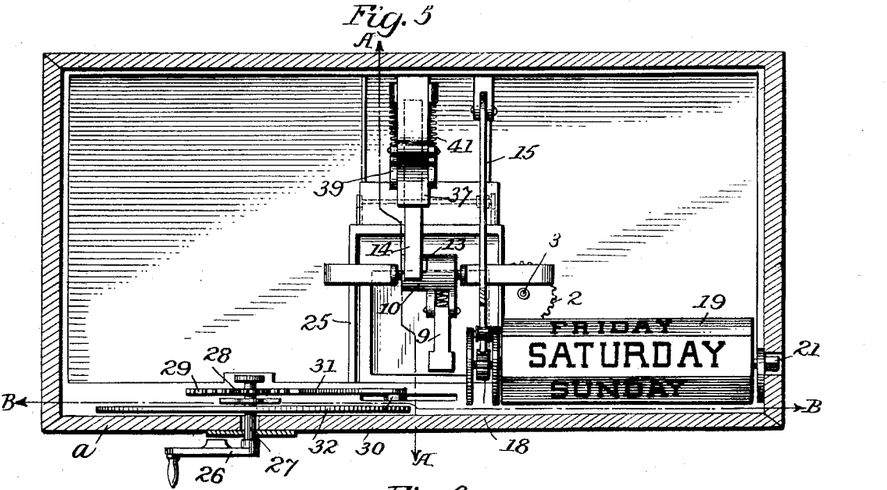
Fig. 5 is a plan view of my improved device, the casing being shown in section on a horizontal plane.
Figure 6:
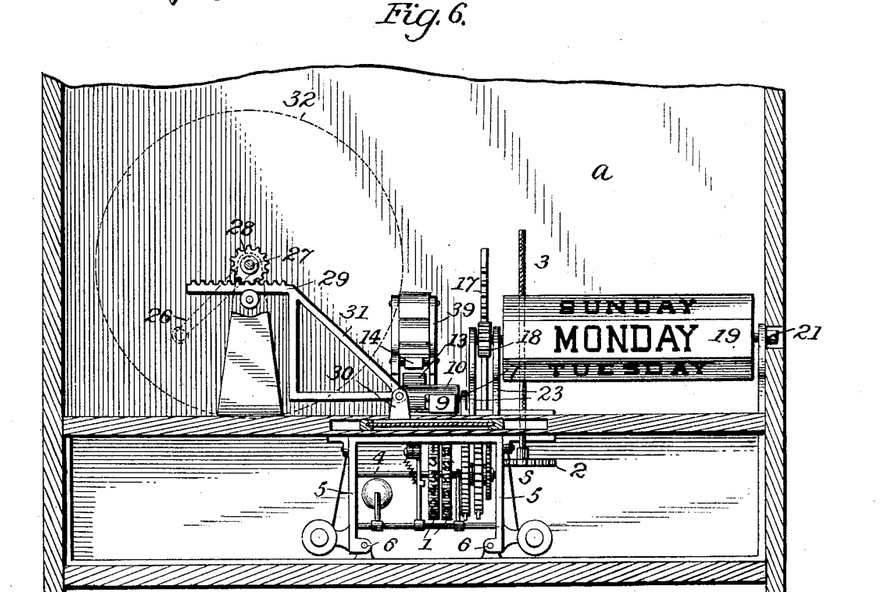
Fig. 6 is a vertical section on line B B, Fig. 5.
Figure 11:
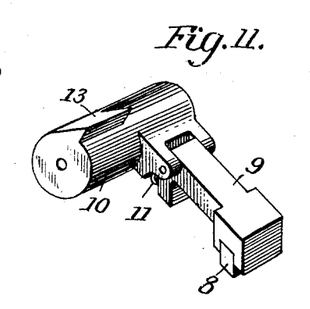
Fig. 11 is a detached perspective view of the actuating-hammer.

The time-stamp comprises mainly a series of movable type suitable for printing the hours of the day and means for impressing said type upon a card or paper. Any suitable time-stamp may be employed, and it is not deemed necessary to illustrate all the details of the mechanism for shifting the type, as such devices are common. As illustrated, the type-stamp comprises a pair of type-wheels 1, which are actuated by suitable mechanism driven by a gear 2 and a flexible shaft 3, said shaft being driven by the clockwork t. The time-wheels are mounted upon an arbor 4 in a frame 5, which slides upon suitable fixed guide-rods 6. Supported above the frame 5 in suitable bearings 7 is a pivoted hammer 8, constituting an impression device which coöperates with the type-wheels 1 to print the time upon an intermediate card. The hammer is carried by an arm 9, jointed to a hub 10, and said arm is prevented from resting upon a card by a spring 11, Figs. 7, 8, and 11. The spring prevents the hammer from striking a second blow when it is dropped, thus insuring the printing of the card in one place only. The hub is prevented from turning more than a given distance by a fixed abutment 12 upon one of the bearings 7. Upon the hub 10 is a tooth 13, which coöperates with a rack 14 to raise the hammer in a manner to be hereinafter described. The time-stamp is movable on the ways or guides 5 to permit of its adjustment into seven positions corresponding to the seven days of the week, so that an impression may be made on a card in a given position on seven different lines—that is, the time for seven days may be printed upon the card while the latter is in the same position in the machine. The time-stamp is moved on the ways 6 by means of an elbow-lever 15, which is connected to the frame of the stamp by link 16 and which carries a sector-gear 17, engaging a pinion 18, fast on a seven-sided drum 19, upon which are printed the days of the week. The drum 19 is adjacent to an opening 20 in the case a, so that the day for which the drum is set may be observed from the outside. The drum may be turned or adjusted by any suitable means. As shown, it is provided with a key-post 21, Figs. 5 and 6, for this purpose. The sector 17 is guided by a roller 22, pivoted in the end of a fixed arm 23. When any given day is seen through the opening 20, the time-stamp is located to print the time upon the corresponding section of the time-card.

Figure 17:
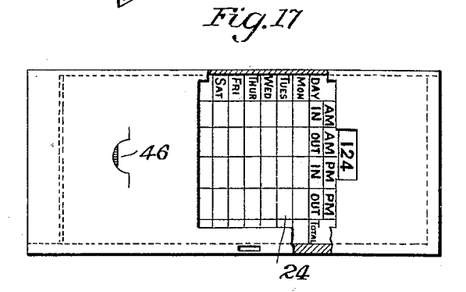
Fig. 17 is an inverted sectional plan view of the card-sheath, on an enlarged scale, having a card inserted therein.

Referring to Fig. 17, 24 indicates a workman's time-card having in the first column at the left the days of the week, in the next two columns spaces for the times of the workman's entrance and departure in the morning, in the next two columns spaces for the times of his entrance and departure in the evening, and in the last column a space for the total for the workman's time for each day of the week. The adjustment of the stamp for the several days of the week has just been described. The adjustment of the card for the different times of the day is effected as follows: A case or receiver 25, Figs. 1, 2, 3, and 15, is provided, into which the card is thrust for printing. This card-receiver is just wide enough to receive a card, and by adjusting the receiver laterally different columns on the card are presented to the time-stamp s. This adjustment is effected by means of a handle 26, which turns a shaft 27, carrying a pinion 28. Pinion 28 is in mesh with a rack 29, which is connected by an inclined bar 31 with a lug 30 upon the receiver 25. Upon the shaft 27 is an indicator-wheel 32, bearing the words "Morning in," "Noon out," &c., or similar words to indicate the directions in which the workmen go at certain hours of the day. The handle 26 is turned until the proper inscription on the wheel 32 appears at an opening 33 in the front of the case. The handle 26 is limited in its movements by pins 34 to prevent turning it too far in either direction. The card-receiver 25 has its forward end guided in an opening 35 in the casing a, and its rear end slides in transverse guides 36, attached to the time-stamp frame 5. The guides 36 support at their inner ends the bearings 7, which carry the impression-hammer.

The impression device is actuated upon the insertion of a card by mechanism which will now be described.

Figure 3:
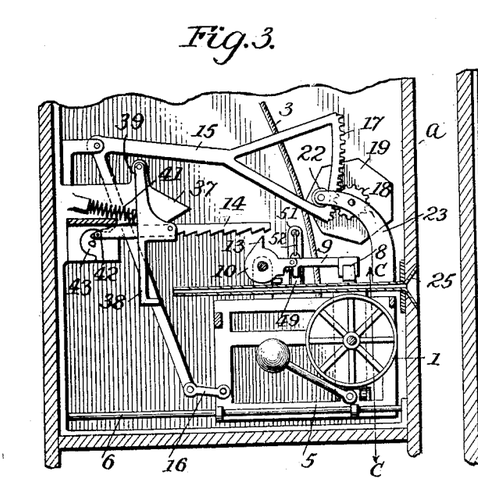
Fig. 3 is a vertical section of the device taken on line A A, Fig. 5, showing the time-stamp in position for recording the time-card in the space provided thereon for Monday.
Figure 4:
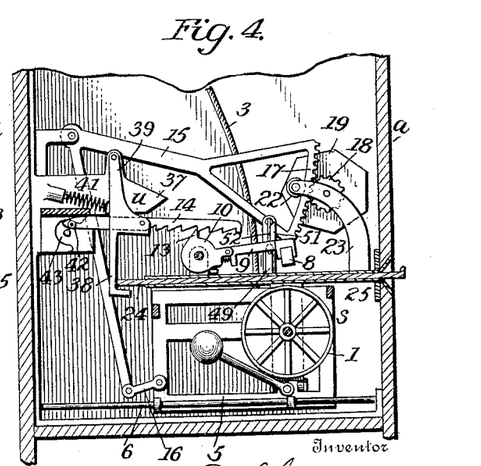
Fig. 4 is a similar view showing the time-card in engagement with the actuating device, the time-stamp in position for recording the time on the time-card in the space provided thereon for Thursday.
Figure 10:
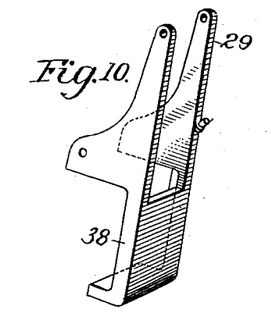
Fig. 10 is a detached perspective view of the card-abutment forming part of the actuating mechanism.

In the rear of and above the time-stamp is a fixed bracket 37 of peculiar construction. A lever 38 has two branches 39, which embrace the bracket 37 and are pivoted thereto at their upper ends, Figs. 7 and 10. Lever 38 is termed an "abutment-lever," as it serves as an abutment to limit the inward movement of the cards 24, which cards engage the lower end of the lever. The toothed bar 14 extends between the branches 39 and is pivotally connected at its middle portion with the abutment-lever 38. Bar 14 will be termed the "actuating-bar," for the reason that it engages and actuates the impression-hammer 8. The actuating-bar has a series of seven teeth 40 on its under edge, each adapted to engage the tooth 13 on the hammer-hub 10 to actuate the hammer in a manner to be presently described. The teeth 40 are so spaced that they are respectively in position to engage the tooth 13 in each of the seven positions of the time-stamp corresponding to the seven days of the week. The lever 38 and bar 14 are normally held in a forward position, as illustrated in Fig. 3, by springs 41. On each side of the rear end of bar 14 is an antifriction-roller 42. These rollers engage somewhat-circular grooves 43 on the inner faces of wings 44, depending from the bracket 37.

Figure 7:
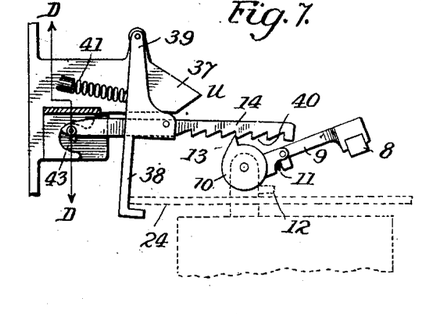
Fig. 7 is an enlarged detached side elevation of the actuating mechanism and the hammer of the time-stamp, the time-card being shown in dotted lines against the abutment thereof, the actuating-bar being in engagement with the hammer, which is elevated thereby.
Figure 8:
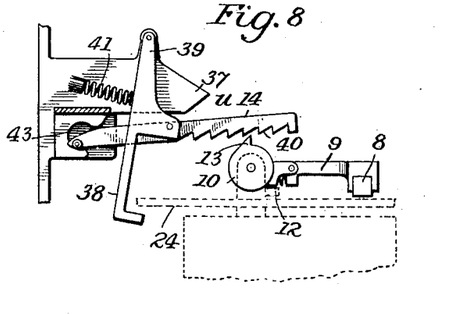
Fig. 8 is a similar view, the abutment being on its return movement after the card has been stamped, which was accomplished by the actuating-bar releasing the hammer.
Figure 9:
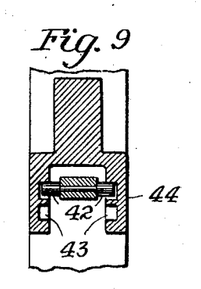
Fig. 9 is a transverse section on line D D, Fig. 7.

The operation of the impression device is as follows: The actuating-bar normally stands with its forward end raised slightly above the tooth 13, as shown in Fig. 3. When a card is inserted, its inner end engages the lower end of lever 38, moving the lever and the bar 14 rearward. The rear end of bar 14 rises at the beginning of the movement, owing to the upward curvature of grooves 43, permitting the toothed end of the bar, which is heavier, to descend until one of the teeth 40 engages the tooth 13. The continued inward movement of the card causes the actuating-bar to raise the impression-hammer and then to release it, the releasing being caused by the downward curvature of grooves 43. As the card reaches the innermost limit of its travel the impression-hammer drops and causes the type on the type-wheels indicating the hour and minute to be impressed on the card. For the purpose of making a visible impression an inking device, such as a type-writer ribbon, (not shown,) is used. The limit of inward movement of the card is determined by the rear portion of the grooves 43. As the card is quickly inserted and quickly withdrawn the rollers 42 follow the grooves 43 rearward, then downward, and then forward. Fig. 7 shows the bar moving rearward, and Fig. 8 shows it moving forward, the forward movement being caused by the springs 41.

Figure 12:
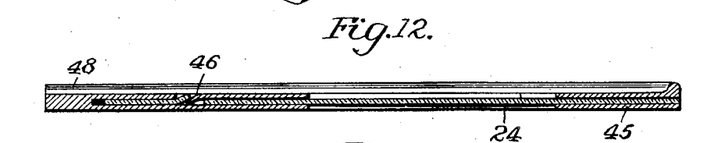
Fig. 12 is a central longitudinal section through the card-sheath and a card held therein.
Figure 13:
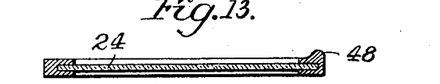
Fig. 13 is a transverse section thereof.
Figures 14, 14A:
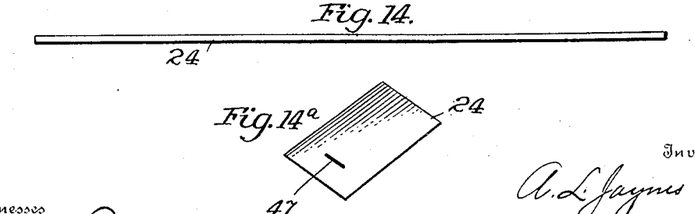
Fig. 14ª is a perspective view of a time-card adapted for use in the sheath.

The mechanism described may be operated by a simple card of stiff material, as illustrated in Fig. 14. If it is desired, however, to use a thin card, it is preferable to strengthen the same by the use of a suitable sheath. In Figs. 12, 13, and 17 is shown a sheath 45, of sheet metal, rubber, or other suitable material, which protects the edges and portions of the upper and lower faces of the card and forms a rigid instrument wherewith to operate the impression device of the recorder. The sheath is cut away above and below to expose the portions of the card which are to be printed. The card may be held in the sheath in any suitable manner. As shown, it is interlocked with the sheath by means of a spring-tongue 46, which enters a slit 47 when the card is pushed into the sheath to its fullest extent and then slightly drawn forward. On one edge of the sheath is a rib 48, which enters a corresponding groove in the card-receiver 25, thus rendering it impossible to place the card in the receiver wrong side up.

Figure 15:
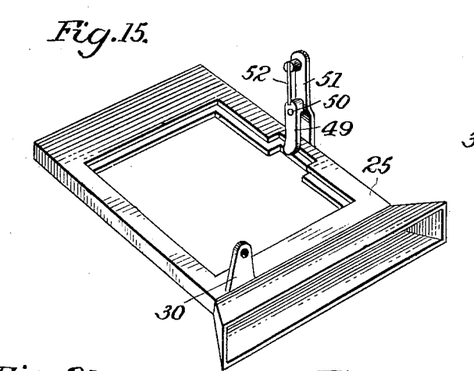
Fig. 15 is a detached perspective view of the card guide or receiver.
Figure 16:
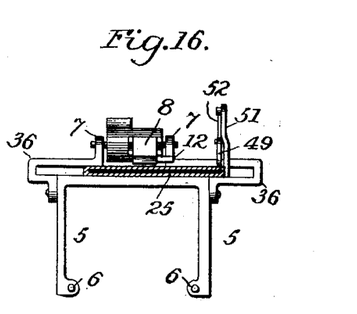
Fig. 16 is a transverse section on line C C, Fig. 3.
Figure 18:
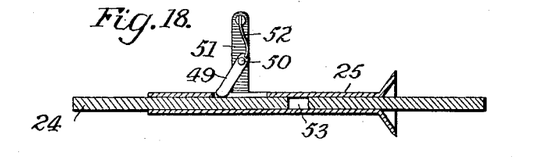
Fig. 18 is an enlarged longitudinal section through the card guide or receiver and the card-sheath, showing the position of the detent-pawl when inserting the card in the machine.
Figure 19:
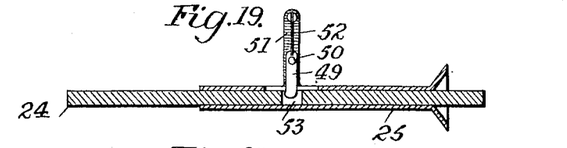
Fig. 19 is a similar view, the card-sheath having arrived to the end of its inward travel, which allows the detent-pawl to enter a slot formed in the card-sheath.
Figure 20:
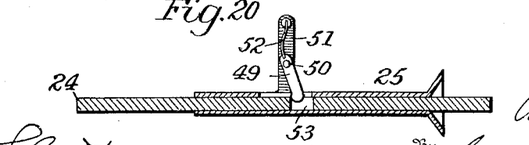
Fig. 20 is a similar view showing the card-sheath as being withdrawn from the card guide or receiver.
Figure 21:
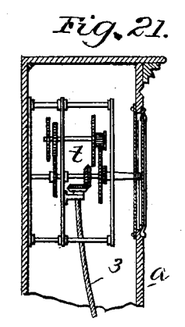
Fig. 21 is a sectional view of the time mechanism.

In Figs. 15 to 20, inclusive, is shown a device for preventing the card from being withdrawn before it has been pushed into the machine sufficiently far to operate the printing mechanism. This device comprises a pawl 49, pivoted at 50 to the bracket 51, extending upwardly from one side of the card-receiver 25. The pawl has its lower end rounded and is normally held in mid-position, as shown in Fig. 15, by a spring 52. The pawl coöperates with a slot 53 in the card or in the card-sheath as follows: As the card is pushed in the pawl swings to the rear, as shown in Fig. 18. It will be seen that if an attempt is made to withdraw the card while the pawl is in this position the card will be clamped and held strongly by the pawl. The card cannot be withdrawn until the slot 53 reaches a position which permits the pawl to swing into it, which position is that in which the card operates the printing mechanism. After the pawl has entered the slot 53, as shown in Fig. 19, the card may be withdrawn readily, the pawl swinging in the other direction freely, as shown in Fig. 20.

Figure 1:
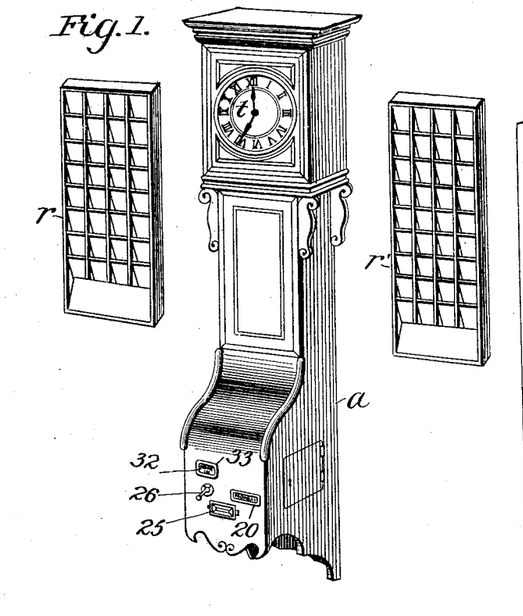
Figure 1 is a perspective view of a complete time-recorder provided with my improvements and two card-racks in proximity thereto, one to receive the cards when the workmen are at work, the other to receive the cards when not at work.
Figure 2:
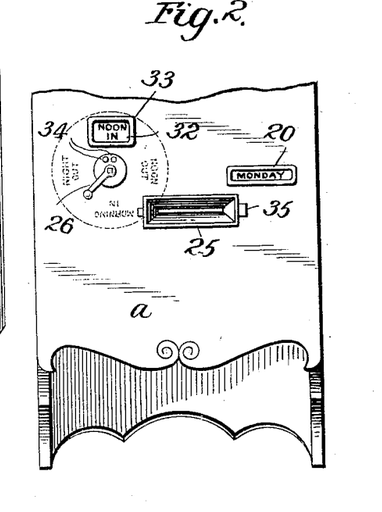
Fig. 2 is a front elevation of the lower end of the recorder.

From the foregoing description the operation of the invention will be fully understood and it need, therefore, be only briefly recapitulated. The machine when constructed as illustrated is set four times each day. It is first set to correspond to the day of the week, which moves the time-stamp into proper position to print in the space on the card alloted to the particular day. As shown in Figs. 2 and 3, the machine is set for Monday. During each day the machine is set to correspond to the different movements of the workmen. Thus in the morning it is set with the words "Morning in" at the indicator-opening 33. This will cause the cards to be printed in the first column at the left as the workmen enter. At noon-time it is first set for "Noon out," which causes the cards to be printed in the second column as the workmen go out to dinner. It is then set for "Noon in" and again in the evening set for "Night out." The workmen keep their cards in two racks $r$ $r'$, which are arranged, as shown in Fig. 1, on opposite sides of the recorder, and as they go in and out they move the cards from one rack to the other in the direction in which they are going. The machine is set for the day of the week and the in and out movements of the workmen by an attendant in charge of it, and the wheels of the time-stamp are controlled by the clock. The workman has, therefore, nothing to do but to push his card into the machine and withdraw it again, and he always pushes it in to the same extent. The maximum economy of the time of the workman is thereby accomplished, and the greatest possible number of workmen are accommodated by one machine. Furthermore, the workman is prevented from stamping his time on the wrong part of the card, an error which is quite possible in other machines.

It is to be understood that the invention is not limited to the precise construction and arrangement of mechanism illustrated and described, but is susceptible of being embodied in many different mechanical forms. It is, further, to be understood that the time-card sheath is not essential to the operation of the machine, but is preferable in some instances in which it may be desired to use cards which are of light material.

It is to be understood that in the following claims the word "card" when not associated with the sheath is to be considered as a broad term, including either a plain card or a card provided with a sheath or stiffening device. In other words, a stiff card without a sheath and a more flexible card provided with a sheath are equivalents for the purposes of operating the time-stamp, and the word "card" as used in the claims is to be considered as covering all such equivalents.

Having described my invention, what I claim, and desire to secure by Letters Patent, is—

1. In a time-recorder, the combination of a time-stamp, time mechanism connected thereto, and means whereby a record is printed by said stamp upon a card, said means being constructed and arranged to be operated by the card to be printed as the latter is presented to the time-stamp.

2. In a time-recorder, the combination with a time-stamp comprising adjustable type, and an impression device coöperating with said type, of time mechanism for adjusting said type, and means for operating the impression mechanism to print the time upon a card, said means being constructed and arranged to be operated by the card as the latter is presented to the time-stamp.

3. In a time-recorder, the combination with a time-stamp comprising time-printing wheels, and an impression device coöperating with said wheels, of time mechanism for adjusting said wheels, and means for operating the impression mechanism to print the time upon a card, said means being constructed and arranged to be operated by the card as the latter is presented to the time-stamp.

4. In a time-recorder, the combination with a time-stamp comprising adjustable type, and an impression device coöperating with said type, of time mechanism for adjusting said type, a movable abutment constructed and arranged to limit the inward movement of a card presented to said time-stamp, and a connection between said abutment and said impression device whereby the movement of the abutment by the card causes the impression device to imprint the time upon said card.

5. In a time-recorder, the combination with a time-stamp comprising adjustable type, and an impression device coöperating with said type, of time mechanism for adjusting said type, and means for operating the impression mechanism to print the time upon a card, said means being constructed and arranged to be operated by the card as the latter is presented to the time-stamp, and said operating means and time-stamp being relatively adjustable whereby the latter is adapted to print upon different sections of the card.

6. In a time-recorder, the combination with a time-stamp comprising adjustable type, and an impression device coöperating with said type, of time mechanism for adjusting said type, and means for operating the impression mechanism to print the time upon a card, said time-stamp being adjustable to different positions to correspond to different days or dates, and said means for operating the impression mechanism being constructed and arranged to be operated by the card as the latter is presented to the time-stamp.

7. In a time-recorder, the combination with a time-stamp comprising adjustable type, and an impression mechanism coöperating with said type, of time mechanism for adjusting said type, a card-receiver into which the card is inserted to be printed by the time-stamp, means for moving said stamp relatively to said receiver to cause the stamp to print upon different parts of the card, and operating means for the impression mechanism constructed and arranged to be actuated by the card as the latter is presented to the time-stamp.

8. In a time-recorder, the combination with a time-stamp comprising adjustable type, and an impression device coöperating with said type, of time mechanism for adjusting said type, a movable abutment arranged to limit the movement of a card presented to said time-stamp, and a connection between said abutment and said impression device, said abutment and time-stamp being relatively movable and said connection being adapted to operate the time-stamp in any of its relative positions.

9. In a time-recorder, the combination with a card-receiver adjustable in one direction, and a time-stamp adjustable in a direction at right angles to the path of the card-receiver, and comprising adjustable type and an impression device coöperating with said type, of means for operating the impression mechanism to print the time upon a card, said means being constructed and arranged to be operated by the card as the latter is presented to the time-stamp.

10. In a time-recorder, the combination of a laterally-movable card-receiver, a time-stamp movable longitudinally of said receiver, and an abutment providing a fixed limit to the longitudinal movements of cards thrust into said receiver, whereby different sections of a card may be printed, the card being always thrust into the receiver to the same extent.

11. In a time-recorder, the combination of a bodily-movable time-controlled stamp, and actuating mechanism movable within fixed limits and adapted to be operated by the time-card to actuate said time-controlled stamp in any of its adjustments to print upon said card, for the purpose set forth.

12. In a time-recorder, the combination with the time-stamp and time mechanism for operating the same, of a card guide or receiver, a pivoted abutment adapted to be operated by a time-card, and a part connected to said abutment adapted to actuate an impression mechanism to print upon said card, substantially as set forth.

13. In a time-recorder, the combination with the time mechanism, of a time-stamp embodying marking-wheels operated thereby, a movable hammer having a tooth or trip formed thereon and adapted to coact with said marking-wheels, a card guide or receiver in proximity to said stamp, an abutment pivoted at its upper end and arranged to be operated by said time-card, a bar pivoted between its ends to said abutment and having a series of teeth formed thereon which are adapted to engage the tooth or trip formed on said movable hammer so as to elevate the same, and means for controlling the movement of said bar whereby it is disengaged from the hammer and allows the same to drop, thus causing the time-card to be marked, substantially as set forth.

14. In a time-recorder, the combination with the time mechanism, of a time-stamp embodying marking-wheels operated thereby, a movable hammer having a tooth or trip formed thereon and adapted to coact with said marking-wheels, a card guide or receiver in proximity to said stamp, an abutment pivoted at its upper end and arranged to be operated by the time-card, an actuating-bar pivoted between its ends to said abutment and having a series of teeth formed thereon which are adapted to engage the tooth or trip formed on said movable hammer so as to elevate the same, and means for controlling the movement of said actuating-bar whereby it is disengaged from the hammer and allows the same to drop, thus causing the time-card to be marked, substantially as set forth.

15. In a time-recorder, the combination with a time-controlled stamp manually adjustable in one direction, of a card-guide manually adjusted in another direction, a time-card adapted to be stamped, and actuating mechanism operated by said time-card whereby it is caused to be marked by said time-controlled stamp, substantially as set forth.

16. In a time-recorder, the combination with a time-stamp and time mechanism for adjusting the same, of an impression device, a time-card having a reinforcing device permanently connected thereto, and the actuating mechanism for said impression device constructed to be operated by the insertion of said reinforced time-card, whereby the time-card is automatically marked by the time-stamp when inserted in the machine.

17. In a time-recorder, the combination with a time-controlled stamp, a shaft having an indicator thereon, operating connections between the two whereby said time-controlled stamp is adjusted by said shaft, an impression device, a card guide or receiver in proximity to said stamp, a time-card adapted to enter said card guide or receiver, and actuating mechanism for the impression device constructed to be operated by said time-card, whereby the time-controlled stamp is actuated, substantially as set forth.

18. In a time-recorder, the combination with the casing having a sight-opening therein, of a time-controlled stamp, a shaft carrying an indicator bearing the days of the week and being located in rear of said sight-opening, a pinion secured to said shaft, a bell-crank lever having a gear-segment at one end adapted to mesh with said pinion, a link connecting the other end of said bell-crank lever with the time-controlled stamp, a card guide or receiver in proximity to said stamp, and actuating mechanism whereby the card when placed in said guide or receiver is caused to be stamped or marked, substantially as set forth.

19. In a time-recorder, the combination with a card guide or receiver, and a time-card adapted to enter said guide or receiver, of means for trapping or retaining a card partially inserted in the card-guide to prevent its withdrawal before it has been properly inserted for printing and to prevent its withdrawal after printing.

20. In a time-recorder, the combination with a card guide or receiver and a time-card adapted to enter said card guide or receiver, of means for trapping or retaining a card partially inserted in the card-guide to prevent its withdrawal before it has been properly inserted for printing, and means for releasing the card when fully inserted, said latter means being operated by the card.

21. In a time-recorder, the combination with a time-controlled stamp, of actuating mechanism therefor, a card guide or receiver in proximity to said stamp, a pawl pivotally held on said card guide or receiver, a time-card having a slot therein and being adapted to tilt said pawl and slide under said pawl until said slot is directly under the same, when the card may be withdrawn from said card guide or receiver.

22. In a time-recorder, the combination with an adjustable time-controlled stamp having an actuating-hammer pivoted thereto and a tooth or trip formed on said hammer, of a card guide or receiver, a time-card adapted to be marked, an abutment pivoted at its upper end and adapted to be operated by said time-card, an actuating-bar pivoted between its ends to said abutment and having a series of teeth formed thereon and rollers secured thereto at its rear end on opposite sides thereof, one of the teeth of said actuating-bar being engaged with the tooth or trip on the actuating-hammer by the movement of the abutment, and a casting secured to the casing having grooves in which said rollers travel and whereby the front end of the actuating-bar is raised and disengaged from the tooth or trip of said actuating-hammer, thereby allowing the hammer to drop and cause the time-card to be marked, substantially as set forth.

23. The combination with a stamp, of a card guide or receiver, a card adapted to be stamped, a movable abutment adapted to be operated by said card, and an actuating-bar connected to said abutment and adapted to actuate the stamp, substantially as set forth.

24. The combination with the stamp, of a movable hammer having a tooth or trip formed thereon and adapted to coact with said stamp, a card adapted to be stamped, an abutment pivoted at its upper end and operated by said card, an actuating-bar pivoted between its ends to said abutment and having a series of teeth formed thereon, one of which is adapted to engage the tooth or trip formed on said movable hammer so as to elevate the same, and means for controlling the movement of said actuating-bar whereby it is disengaged from the hammer and allows the same to drop, thus causing the card to be marked, substantially as set forth.

25. In a time-recorder, the combination with a time-stamp, time mechanism for adjusting said stamp, a time-card, and an impression device adapted to be set in motion by the time-card when the latter is inserted to be printed, whereby the printing of the card is effected by the presentation of the card to the time-stamp.

26. In a workman's time-recorder, the combination of a casing, a time-stamp having suitable mechanism for setting the same, a card-guide and mechanism for producing such a relative movement between the time-stamp and card-guide element that various portions of the surface of the card in the card-guide can be printed upon, and means for effecting the printing by the presence of the card in the guide.

27. In a time-recorder, the combination of a card-guide and time-stamp mechanism including means for setting the time-stamp, one of the time-stamp and card-guide elements being adjustable with respect to the other so as to effect the printing on various portions of the card, and means for causing an impression to be made, controlled by a movement of the card while in the card-guide.

28. In a time-recorder, the combination of a card-guide and time-stamp, one bodily adjustable with respect to the other, means for adjusting the types of the time-stamp, and means for effecting the printing directly by mechanism whose movement is initiated by a movement of the card in the time-stamp.

29. In a time-recorder, the combination of a card-receiver for receiving the time-card to be printed, an abutment fixed relatively to the mouth of said receiver providing a limit to the movement of cards thrust into said receiver and a time-stamp, said receiver being bodily movable relatively to said time-stamp in order to print upon different parts of a card held therein.

In testimony whereof I have signed my name in the presence of two subscribing witnesses.

ALFONSO L. JAYNES.

Witnesses:
FREDERICK C. GOODWIN,
ALBERT H. GRAVES.

Correction in Letters Patent No. 704,194.

It is hereby certified that in Letters Patent No. 704,194, granted July 8, 1902, upon the application of Alfonso L. Jaynes, of Buffalo, New York, for an improvement in "Workmen's Time Recorders," an error appears in the printed specification requiring correction, as follows: In line 87, page 5, the word "prevent" should read *permit;* and that the said Letters Patent should be read with this correction therein that the same may conform to the record of the case in the Patent Office.

Signed and sealed this 22d day of July, A. D., 1902.

[SEAL.]

E. B. MOORE,
*Acting Commissioner of Patents.*